Feb. 1, 1927. 1,615,906
O. KUHNER
TEMPORARY END CLOSURE FOR LOCOMOTIVE VALVE CHAMBERS
Filed Jan. 26, 1924
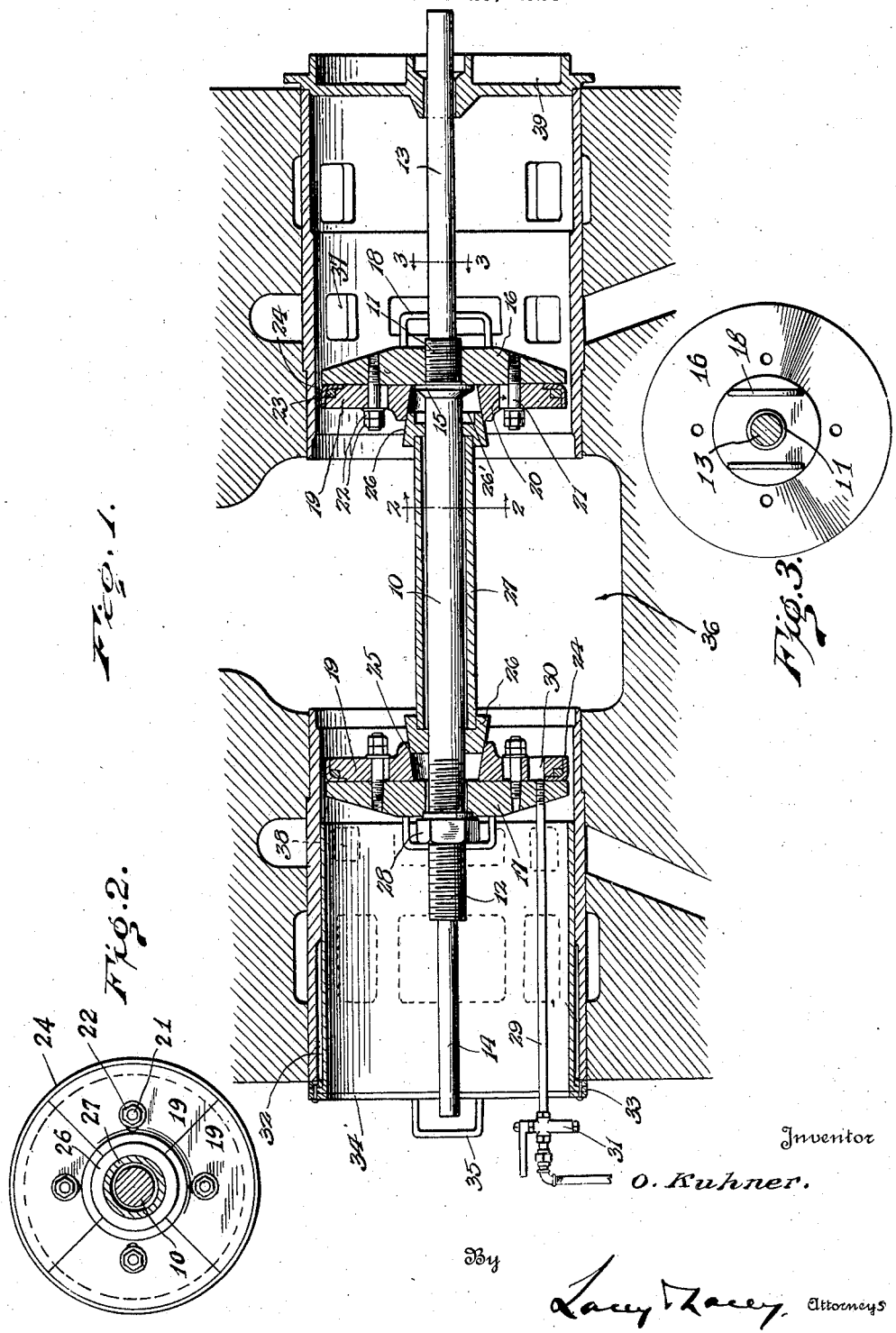
Inventor
O. Kuhner.
By
Lacy & Lacy, Attorneys Patented Feb. 1, 1927.

1,615,906

UNITED STATES PATENT OFFICE.

OSCAR KUHNER, OF COLUMBUS, OHIO.

TEMPORARY END CLOSURE FOR LOCOMOTIVE-VALVE CHAMBERS.

Application field January 26, 1924. Serial No. 688,779.

This invention relates to an improved temporary end closure for locomotive valve chambers, being of the general character disclosed in Patent No. 1,462,113, granted to me July 17, 1923, and seeks, among other objects, to provide a device of the character indicated wherein the steam ports of a valve chamber may be blocked off without the necessity for removing the back head of the chamber.

The invention seeks, as a further object, to provide a device embodying spaced heads each carrying radially shiftable clamping means to coact with the wall of the valve chamber and wherein the clamping means of both heads may be shifted by the adjustment of a single nut.

And the invention seeks, as a still further object, to provide a liner for use in connection with the device to facilitate the assembling of the device in a valve chamber.

Other and incidental objects will appear hereinafter.

In the drawings:

Figure 1 is a vertical longitudinal sectional view through my improved temporary end closure, the device being shown in position in a conventional locomotive valve chamber, Figure 2 is a detail sectional view on the line 2—2 of Figure 1, looking in the direction of the arrows, and Figure 3 is a detail sectional view on the line 3—3 of Figure 1, looking in the direction of the arrows.

In carrying the invention into effect, I employ a cylindrical body bar 10 provided with threaded portions 11 and 12 and terminating at its ends in reduced handles 13 and 14, the handle 13 being somewhat larger in diameter than the handle 14. Formed on the bar at the base of the threaded portion 11 thereof is an annular stop shoulder 15 and threaded upon said portion of the bar to abut said stop shoulder is a circular head 16. Freely fitting over the threaded portion 12 of the bar is a similar head 17. As shown in detail in Figure 3, these heads are equipped with handles 18 and mounted upon each of said heads at its inner side is, as particularly brought out in Figure 2, a series of mating segmental clamps 19. Formed in the clamps are radial slots 20 and extending freely through said slots are stud bolts 21 threaded into the heads and each carrying a pair of nuts 22 slidably connecting the clamps with the heads. At their outer ends, each set of clamps is stepped to accommodate a split resilient ring 23 and surrounding said ring is an expansible annular gasket 24. These gaskets overlie the outer ends of the clamps and extend at their inner margins between the clamps and the heads. At their inner ends, the clamps are beveled so that the clamps upon each of the heads thus cooperate to define a tapered opening 25 and fitting in said openings are conical expanders 26 which are fixed upon the ends of a sleeve 27 surrounding the body bar 10, the sleeve and the expanders providing a double-ended expander unit. As will be observed, one of said expanders is recessed, as indicated at 26', to receive the stop shoulder 15 upon the body bar so that said expander may advance partially over said shoulder. Threaded upon the portion 12 of the body bar to coact with the outer side of the head 17 is a nut 28, the head and the nut being ground to form a tight joint, and detachably connected to the head 17 is a drain pipe 29 registering at its inner end with a slot 30 in the adjacent one of the clamps upon said head. Interposed in said pipe is a suitable shut-off valve 31.

I further employ a cylindrical liner 32 which may be formed of suitable sheet metal and is provided at its outer end with an annular flange 33. Overlying said flange at opposite sides thereof are reinforcing rings 34 secured to the flange by rivets or other suitable fastening devices and extending through the rings and the flange at opposite sides of the liner is a pair of handles 35.

In Figure 1 of the drawings, I have shown my improved device in position in a conventional locomotive valve chamber embodying the usual central passage 36 from the superheater of the locomotive, rear steam ports 37, and front steam ports 38. Closing the chamber at its rear end is the customary back head 39 and, of course, a similar closure is normally mounted at the front end of the chamber. To install the device, the front head of the chamber is removed as is also the valve mechanism. The head 16 of the device is then rolled edgewise through the forward portion of the valve chamber and positioned within the rear portion thereof in front of the ports 37, when the body bar is then threaded through said head, the handle 13 of the body bar being projected through the back head 39 of the valve chamber. Thus, the back head will coact with the bar for holding the bar centered within the valve chamber. The expander unit is then slipped over the body bar and the rearwardly presented expander 26 thereof disposed to coact with the inner ends of the clamps 19 of the head 16. The liner 32 is then fitted into the forward end of the valve chamber when the head 17 is slipped through the liner over the forward end of the body bar until the clamps 19 of said head are brought into engagement with the forwardly presented expander of the expander unit. The liner may then be removed, when the nut 28 is applied to the portion 12 of the body bar and the pipe 29 attached to the head 17. Consequently, as will be seen, the nut 28 may be adjusted for advancing the head 17 toward the head 16 when the expanders 26 of the expander unit will be caused to coact with the clamps 19 of said heads for shifting said clamps radially and expanding the gaskets 24 into binding engagement with the wall of the valve chamber forming closed joints therewith. Water may then, of course, be introduced into the superheater, header and steam pipes for testing these parts, after which the water may be drawn off through the pipe 29.

By employing a double-ended expander unit so that the single nut 28 may be adjusted for shifting the clamps of both of the heads 16 and 17, I provide, as will be seen, a device wherein the necessity for removing the back head 39 of the valve chamber is eliminated. This feature is of decided advantage since, on some locomotives, the valve cross head guides are fastened to the back head of the valve chamber so that by allowing the back head to remain in place, I effect a considerable saving in time and labor. The liner 32 is employed to prevent the gasket associated with the head 17 from catching against the edges of the ports at the forward end portion of the valve chamber. Since the body bar 10 is not in place when the head 16 is introduced into the valve chamber, the head 16 may be rolled through the forward portion of the valve chamber and arranged in position. However, the body bar must then, as previously described, be engaged through the head 16 so that the head 17 cannot thus be rolled into place. Accordingly, the liner 32 is employed to cover the steam ports in the front end of the valve chamber so that the head 17 may be slipped through the liner over the body bar without danger of injuring the gasket carried by the clamps 19 of said head. To remove the device, the nut 28 is displaced so that the head 17 may be slipped outwardly over the body bar. The expander unit is then displaced and the body bar detached from the head 16. The head 16 may then, of course, be rolled forwardly out of the valve chamber.

Having thus described the invention, what is claimed as new is:

1. A temporary end closure for locomotive valve chambers, the same comprising a body bar having opposite end portions threaded and having reduced extensions and a stop shoulder, a head threaded upon an end of the body bar and engaging the said stop shoulder, a second head loose upon the opposite end of the body bar, expansible sealing means upon the inner or opposing faces of both heads, a double ended expander loose on the body bar and extending between the said heads, and a nut on the threaded portion of the body bar adjacent the loose head for adjustment thereof and the expander to simultaneously expand both sealing means.

2. A temporary end closure for locomotive valve chambers, the same comprising a body bar threaded and provided at opposite ends with reduced extensions, and having a stop shoulder at one end adjacent a threaded portion, a head threaded upon the body bar and engaging the stop shoulder thereof, a second head loose upon the opposite end of the body bar, expansible sealing means mounted upon the inner sides of the heads and having conical openings, conical expanders loose on the body bar, a sleeve loose on the body bar and extending between the said expanders, and a nut threaded upon the end of the body bar adjacent the loose head to move it and the sleeve and expanders on the bar.

3. In combination with a locomotive valve chamber, means for temporarily closing the ends thereof, consisting of a body bar having a centering extension at one end for cooperating with a closure at one end of the valve chamber, a head secured on the body bar adjacent the extension thereof, a second head loose upon the opposite end of the body bar, expansible sealing means carried by both heads, a lining removably fitted within the opposite end of the valve chamber from the first head for the sealing means carried by the said second head to ride upon, a double ended expander loose on the body bar and extending between the said heads, and means on the body bar to adjust the loose head and double ended expander to simultaneously expand both sealing means.

In testimony whereof I affix my signature.

OSCAR KUHNER. [L. S.]